(12) United States Patent
Kataoka et al.

(10) Patent No.: US 10,397,022 B2
(45) Date of Patent: Aug. 27, 2019

(54) GATEWAY DEVICE AND COMPUTING DEVICE

(71) Applicant: HITACHI AUTOMOTIVE SYSTEMS, LTD., Hitachinaka-shi, Ibaraki (JP)

(72) Inventors: Mikio Kataoka, Tokyo (JP); Mitsuhiro Kitani, Tokyo (JP); Hidetoshi Teraoka, Tokyo (JP); Kenichi Osada, Hitachinaka (JP); Naoyuki Yamamoto, Hitachinaka (JP); Masaaki Nakamura, Hitachinaka (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 0 days.

(21) Appl. No.: 15/749,594

(22) PCT Filed: Jun. 7, 2016

(86) PCT No.: PCT/JP2016/066958
§ 371 (c)(1),
(2) Date: Feb. 1, 2018

(87) PCT Pub. No.: WO2017/038188
PCT Pub. Date: Mar. 9, 2017

(65) Prior Publication Data
US 2018/0227147 A1    Aug. 9, 2018

(30) Foreign Application Priority Data

Sep. 3, 2015   (JP) .................................. 2015-173894

(51) Int. Cl.
| | |
|---|---|
| *H04L 12/46* | (2006.01) |
| *H04L 12/40* | (2006.01) |
| *H04L 12/66* | (2006.01) |
| *H04L 12/741* | (2013.01) |
| *H04L 29/08* | (2006.01) |

(52) U.S. Cl.
CPC .............. *H04L 12/46* (2013.01); *H04L 12/40* (2013.01); *H04L 12/66* (2013.01); *H04L 45/74* (2013.01);
(Continued)

(58) Field of Classification Search
CPC ......... H04L 12/46; H04L 12/66; H04L 12/40; H04L 69/324; H04L 45/74
See application file for complete search history.

(56) References Cited

U.S. PATENT DOCUMENTS

2003/0093567 A1*  5/2003  Lolayekar ........... H04L 67/1097
                                                                709/246
2006/0256777 A1* 11/2006  Kimura ................. H04L 29/125
                                                                370/352
(Continued)

FOREIGN PATENT DOCUMENTS

| DE | 10 2012 220 187 A1 | 5/2013 |
|---|---|---|
| DE | 10 2013 217 259 A1 | 3/2015 |

(Continued)

OTHER PUBLICATIONS

International Search Report of PCT/JP2016/066958 dated Aug. 30, 2016.
(Continued)

*Primary Examiner* — Min Jung
(74) *Attorney, Agent, or Firm* — Mattingly & Malur, PC

(57) ABSTRACT

The gateway device includes a plurality of communication ports that are connected to the respective low-level networks and receive low-level data that is transmitted and received to and from the low-level networks; a storage unit that stores each of the plurality of communication ports and a source identifier in association with each other; and a control unit that generates high-level data and transmits the high-level data to the high-level network, in which the payload of the
(Continued)

high-level data that is generated by the control unit includes at least a part of the low-level data that is received by the communication ports, and in which the header of the high-level data that is generated by the control unit includes the source identifier which is associated with the communication ports.

16 Claims, 10 Drawing Sheets

(52) U.S. Cl.
CPC .. *H04L 69/324* (2013.01); *H04L 2012/40215* (2013.01); *H04L 2012/40234* (2013.01); *H04L 2012/40241* (2013.01); *H04L 2012/40273* (2013.01)

(56) References Cited

U.S. PATENT DOCUMENTS

| | | | |
|---|---|---|---|
| 2006/0259204 A1* | 11/2006 | Jordan | H04L 12/40 701/1 |
| 2012/0106350 A1* | 5/2012 | Yousefi | H04N 7/183 370/241 |
| 2015/0172298 A1 | 6/2015 | Otsuka | |
| 2015/0172424 A1* | 6/2015 | Sone | H04W 4/70 370/401 |
| 2015/0191135 A1 | 7/2015 | Ben Noon et al. | |
| 2016/0182341 A1 | 6/2016 | Fischer et al. | |
| 2018/0304828 A1* | 10/2018 | Kitani | B60W 50/0098 |

FOREIGN PATENT DOCUMENTS

| | | |
|---|---|---|
| JP | 2009-027245 A | 2/2009 |
| JP | 2009-071688 A | 4/2009 |
| JP | 2013-179539 A | 9/2013 |
| JP | 2015-136107 A | 7/2015 |

OTHER PUBLICATIONS

Extended European Search Report received in corresponding European Application No. 16841220.3 dated Jan. 28, 2019.

* cited by examiner

[Fig. 1]
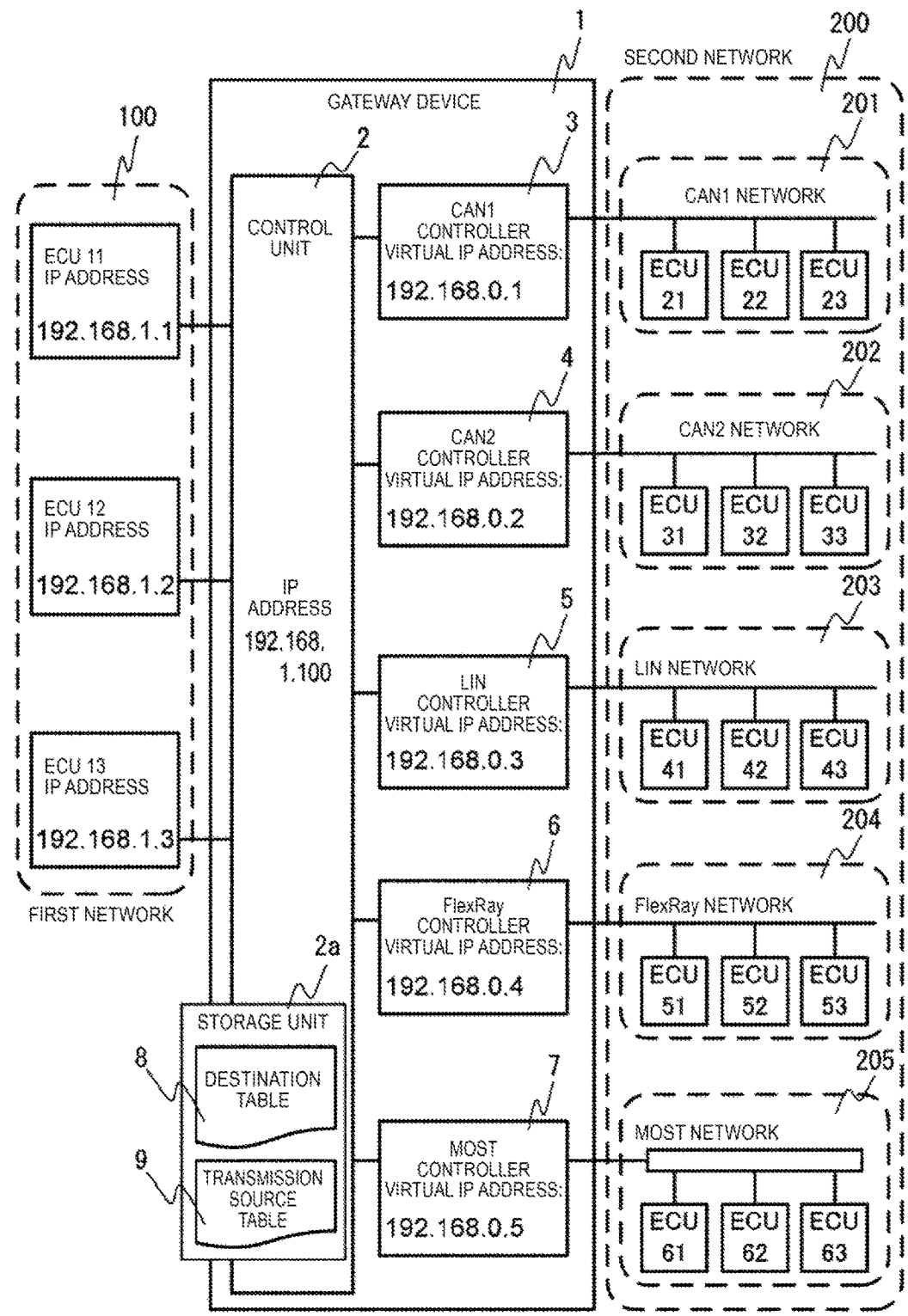

[Fig. 2]
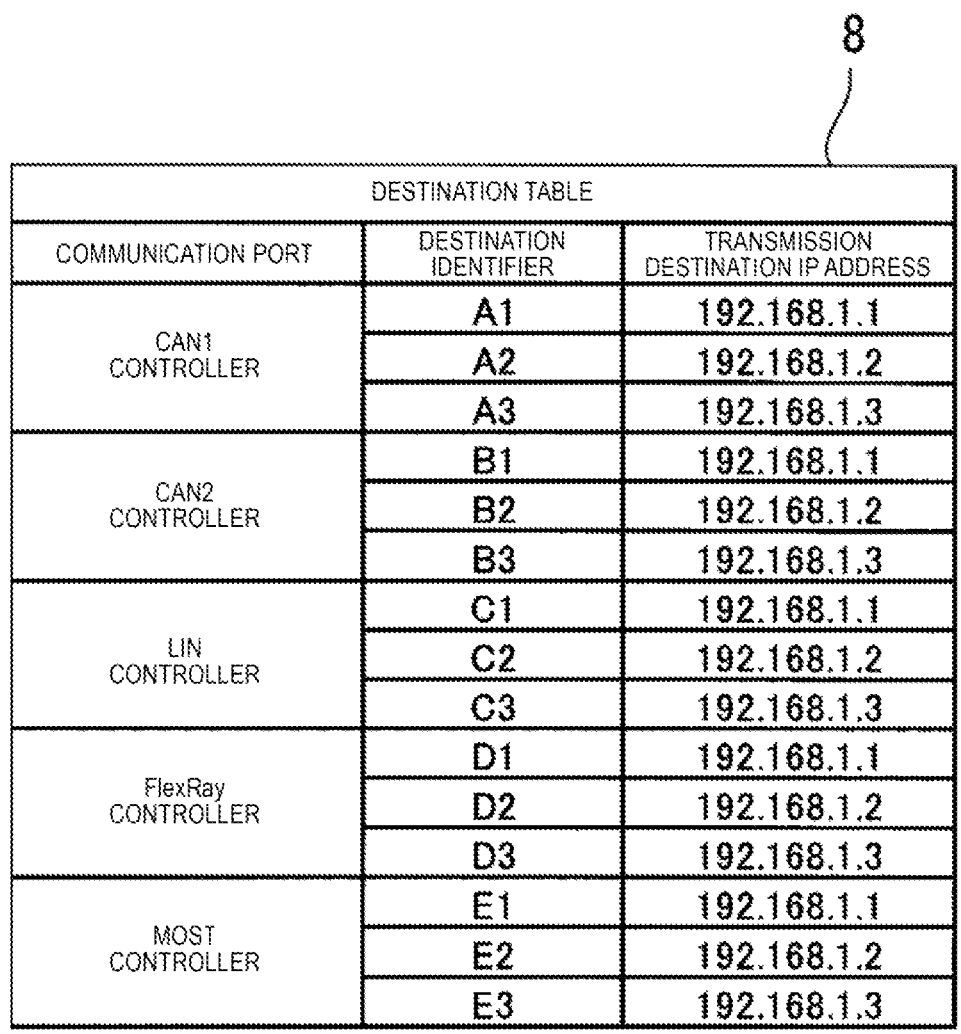

[Fig. 3]
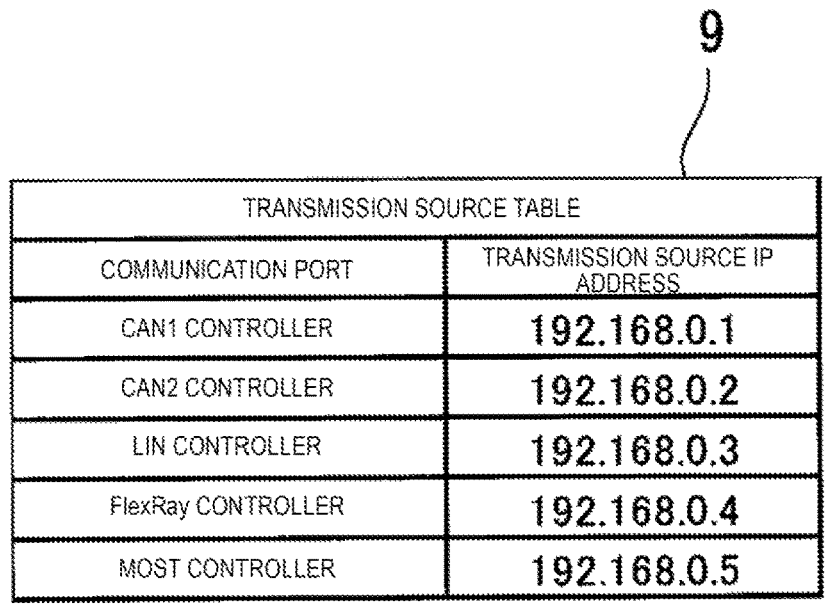
[Fig. 4]
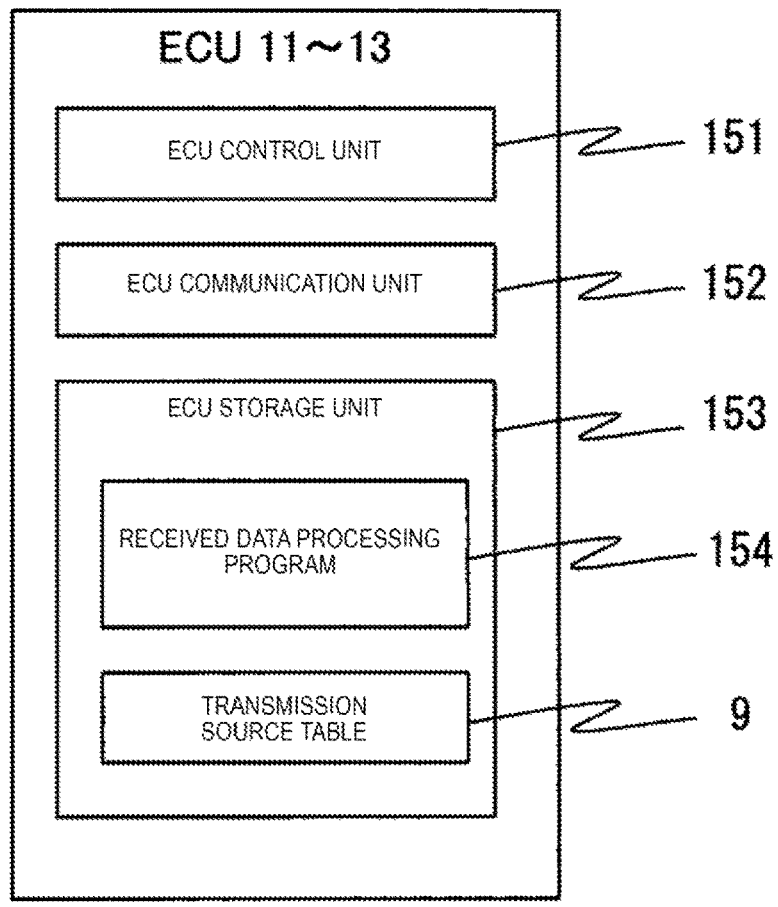

[Fig. 5]
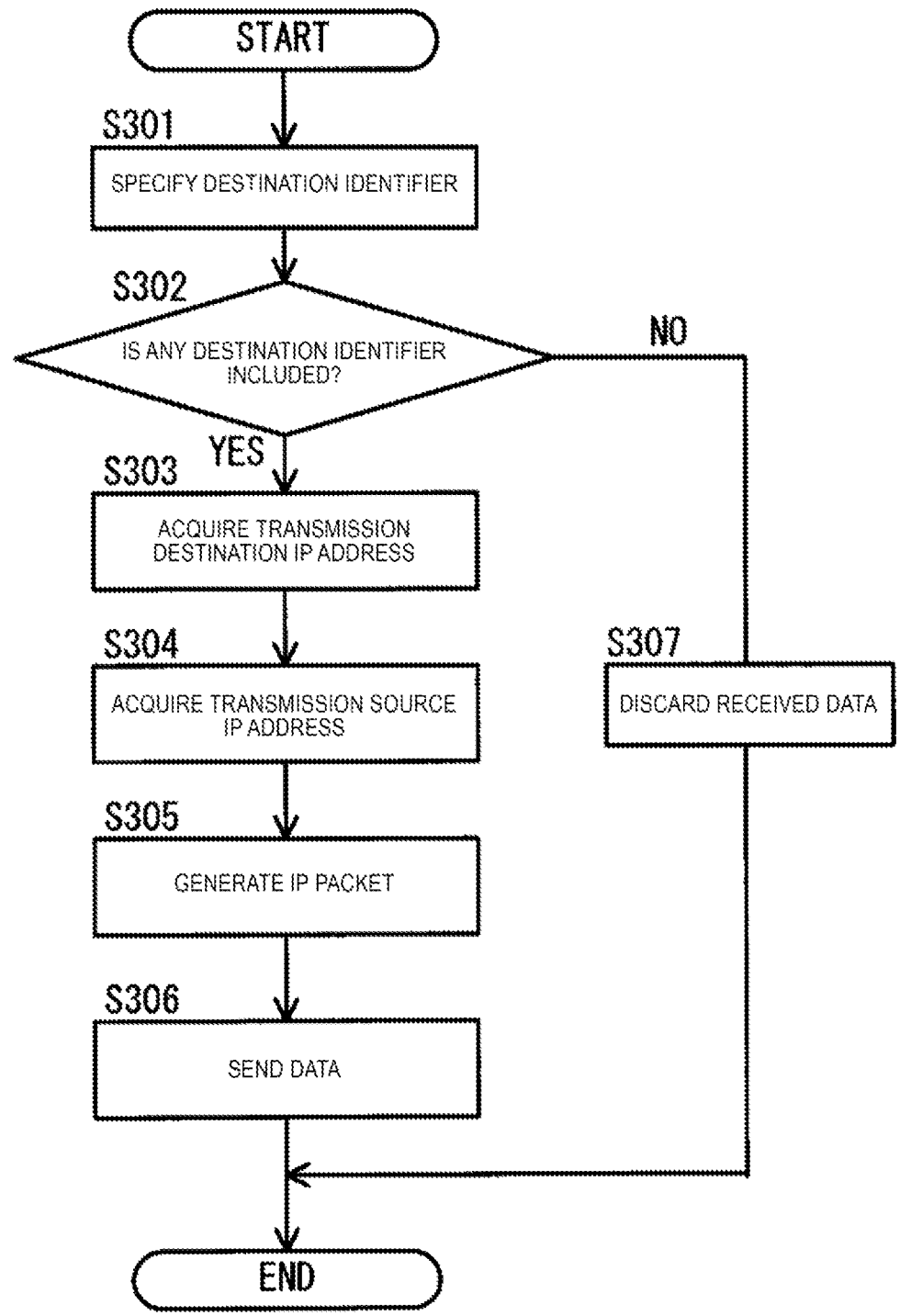

[Fig. 6]
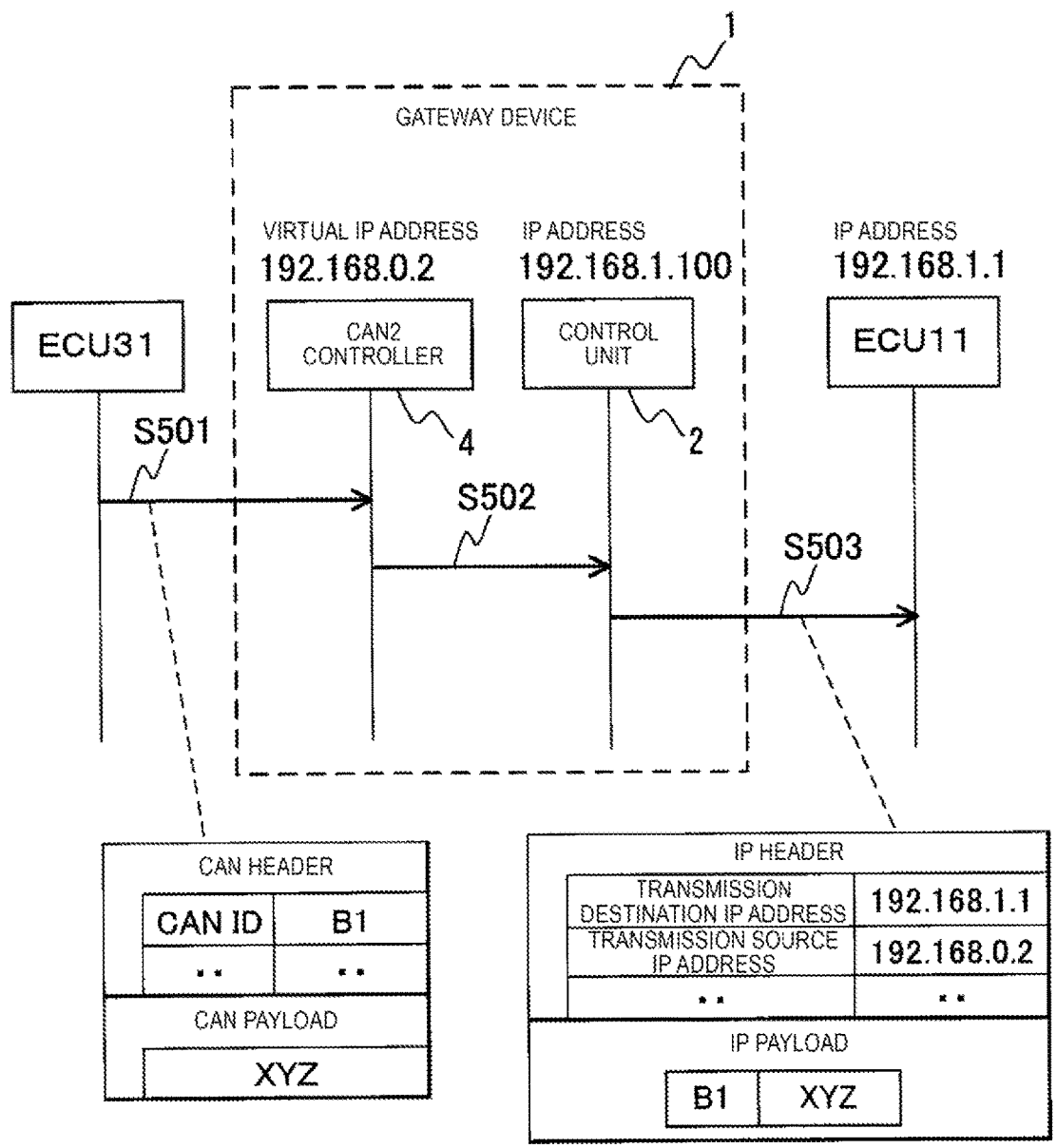

[Fig. 7]

| | | | 8a |
|---|---|---|---|
| DESTINATION TABLE | | | |
| COMMUNICATION PORT | DESTINATION IDENTIFIER | TRANSMISSION DESTINATION IP ADDRESS | PRIORITY VALUE |
| CAN1 CONTROLLER | A1H | 192.168.1.1 | 7 |
| | A1M | | 3 |
| | A1L | | 0 |
| | A2H | 192.168.1.2 | 7 |
| | A2M | | 3 |
| | A2L | | 0 |
| | A3H | 192.168.1.3 | 7 |
| | A3M | | 3 |
| | A3L | | 0 |
| CAN2 CONTROLLER | B1H | 192.168.1.1 | 7 |
| | B1M | | 3 |
| | B1L | | 0 |
| | .. | .. | .. |
| .. | .. | .. | .. |

[Fig. 8]
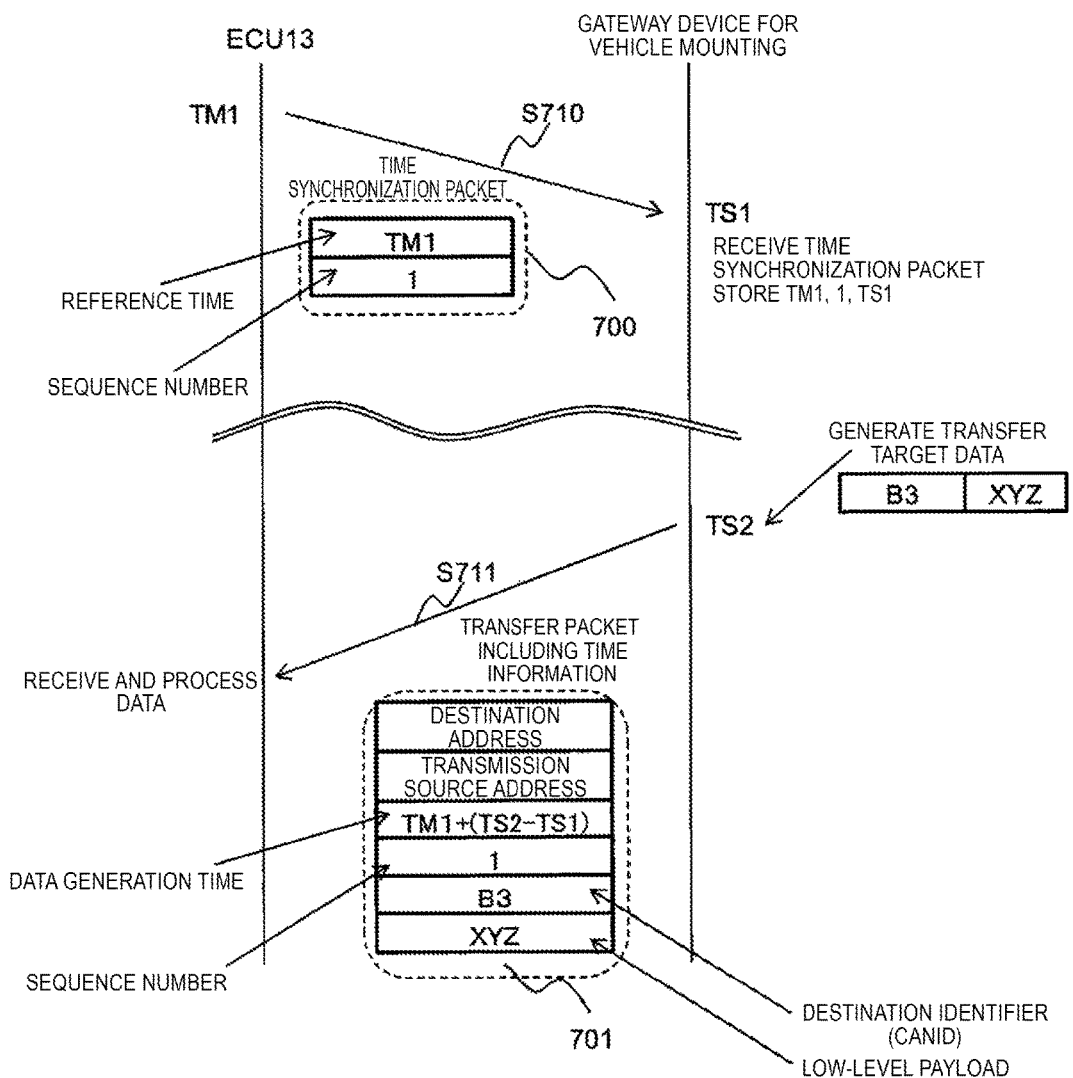

| PROCESSING RATIO TABLE | |
|---|---|
| COMMUNICATION PORT | PROCESSING RATIO (%) |
| CAN1 CONTROLLER | 35 |
| CAN2 CONTROLLER | 25 |
| LIN CONTROLLER | 5 |
| FlexRay CONTROLLER | 20 |
| MOST CONTROLLER | 15 |

| TRANSMISSION SOURCE TABLE | |
|---|---|
| COMMUNICATION PORT | TRANSMISSION DESTINATION TCP PORT |
| CAN1 CONTROLLER | 50001 |
| CAN2 CONTROLLER | 50002 |
| LIN CONTROLLER | 50003 |
| FlexRay CONTROLLER | 50004 |
| MOST CONTROLLER | 50005 |

[Fig. 11]
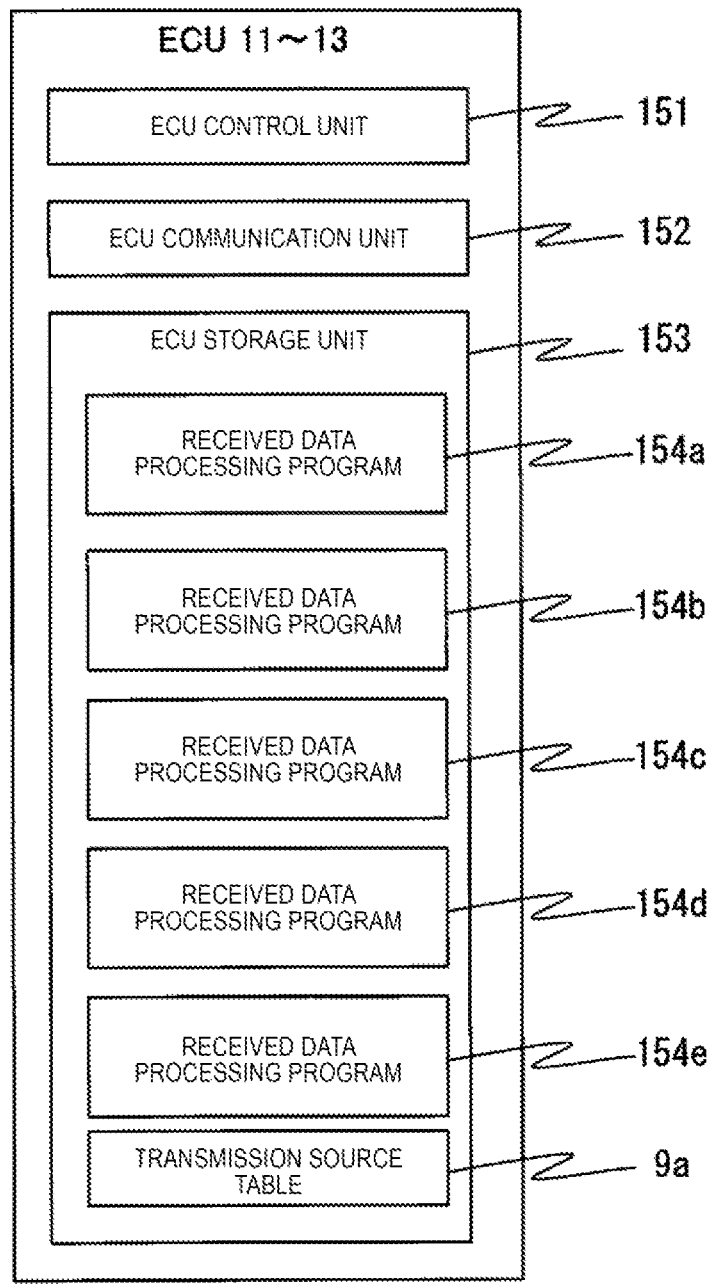

[Fig. 12]

| TRANSMISSION SOURCE TABLE | |
|---|---|
| COMMUNICATION PORT | TRANSMISSION SOURCE MAC ADDRESS |
| CAN1 CONTROLLER | 02:00:00:00:00:01 |
| CAN2 CONTROLLER | 02:00:00:00:00:02 |
| LIN CONTROLLER | 02:00:00:00:00:03 |
| FlexRay CONTROLLER | 02:00:00:00:00:04 |
| MOST CONTROLLER | 02:00:00:00:00:05 |

9b

GATEWAY DEVICE AND COMPUTING DEVICE

TECHNICAL FIELD

The present invention relates to a gateway device and a computing device.

BACKGROUND ART

In a large number of electronic control units installed in a vehicle, a network to be connected is determined based on characteristics of an apparatus, required communication speed, and the like. A gateway device is used for communication between different networks.

PTL 1 discloses a communication gateway device that can reduce a delay of transmission and reception of packet data regardless of a difference in speed or the like of the packet data of each network.

CITATION LIST

Patent Literature

PTL 1: JP-A-2009-71688

SUMMARY OF INVENTION

Technical Problem

In the invention described in PTL 1, it is impossible to easily determine from which network data is transmitted.

Solution to Problem

According to a first aspect of the invention, in a gateway device that is connected to a high-level network which uses a predetermined communication protocol and two or more low-level networks which use a communication protocol different from the predetermined communication protocol of the high-level network, high-level data that is transmitted and received to and from the high-level network is configured by a header and a payload, the gateway device includes a plurality of communication ports that are connected to the respective low-level networks and receive low-level data that is transmitted and received to and from the low-level networks; a storage unit that stores each of the plurality of communication ports and a source identifier in association with each other; and a control unit that generates high-level data and transmits the high-level data to the high-level network, in which the payload of the high-level data that is generated by the control unit includes at least a part of the low-level data that is received by the communication ports, and in which the header of the high-level data that is generated by the control unit includes the source identifier which is associated with each of the communication ports.

According to a second aspect of the invention, a computing device, that belongs to the high-level network which is connected to the gateway device according to the first aspect, includes a computing device reception unit that receives the high-level data from the gateway device; and a received data processing determination unit that determines processing of the payload which is received, based on the source identifier which is included in the header configuring the high-level data that is received.

Advantageous Effects of Invention

According to the invention, it is possible to easily determine from which network data is transmitted.

BRIEF DESCRIPTION OF DRAWINGS

FIG. 1 is a diagram illustrating configurations of a gateway device 1 and a plurality of networks connected to the gateway device 1.

FIG. 2 is a diagram illustrating an example of a destination table 8.

FIG. 3 is a diagram illustrating an example of a transmission source table 9.

FIG. 4 is a diagram illustrating a configuration of ECUs 11 to 13.

FIG. 5 is a flowchart illustrating an operation of a data transfer program.

FIG. 6 is a transition diagram illustrating an operation example of data transfer.

FIG. 7 is a diagram illustrating an example of a destination table 8a according to a second embodiment.

FIG. 8 is a diagram illustrating a processing flow of time synchronization performed between the gateway device 1 and the ECUs 11 to 13 according to a third embodiment.

FIG. 9 is a diagram illustrating an example of a processing ratio table 801 according to a fourth embodiment.

FIG. 10 is a diagram illustrating an example of a transmission source table 9a according to a fifth embodiment.

FIG. 11 is a diagram illustrating a configuration of the ECUs 11 to 13 according to the fifth embodiment.

FIG. 12 is a diagram illustrating an example of a transmission source table 9a according to a sixth embodiment.

DESCRIPTION OF EMBODIMENTS

First Embodiment

Hereinafter, a first embodiment of the gateway device will be described with reference to FIGS. 1 to 6.

The gateway device is mounted in a vehicle, and connects a plurality of heterogeneous networks existing inside the vehicle to each other, that is, networks which use different communication protocols to each other.

FIG. 1 is a diagram illustrating configurations of a gateway device 1 and a plurality of networks connected to the gateway device 1.

(Configuration of Network)

The network connected to the gateway device 1 is divided into a first network 100 on the left side of the figure and a second network 200 on the right side of the figure. Apparatuses belonging to the first network 100 are, for example, a camera that captures a state of the outside of a vehicle, a laser scanner that measures a distance to an obstacle, a device that collectively controls information on in-vehicle devices, and the like, and handle a large amount of information. The apparatuses belonging to the second network 200 are, for example, a power window module and a wiper module, and handle a relatively small amount of information.

The first network 100 uses IEEE 802.3 as a first layer and a second layer of an OSI reference model, an Internet protocol as a third layer, TCP and UDP as a fourth layer. In other words, the first network 100 is an IP network which uses the Internet protocol. The first network 100 includes an ECU 11 that is an electronic control unit (hereinafter, referred to as an ECU), an ECU 12, and an ECU 13. IP addresses are respectively set for the ECUs 11 to 13 belonging to the first network 100 which is an IP network, the IP address of the ECU is "192.168.1.1", the IP address of the ECU 12 is "192.168.1.2", and the IP address of the ECU 13 is "192.168.1.3". Hereinafter, data transmitted and received in the first network 100 is also referred to as an "IP packet" or "high-level data".

The second network 200 is configured by a CAN1 network 201, a CAN2 network 202, a LIN network 203, a FlexRay network 204, and a MOST network 205. In both the CAN1 network 201 and the CAN2 network 202, a controller area network (CAN) is used as a communication protocol. In the LIN network 203, local interconnect network (LIN) is used as a communication protocol. In the FlexRay network 204, FlexRay is used as a communication protocol. In the MOST network 205, a media oriented systems transport (MOST) is used as a communication protocol. Hereinafter, each of the CAN1 network 201, the CAN2 network 202, the LIN network 203, the FlexRay network 204, and the MOST network 205 is also referred to as a "low-level network". Hereinafter, data transmitted and received in the low-level network is also referred to as "low-level data". The networks that configure the second network 200, that is, all the low-level networks are non-IP networks that do not use the Internet protocol as a third layer of the OSI reference model.

The CAN1 network 201 is configured by an ECU 21, an ECU 22, an ECU 23, and a CAN1 controller 3 to be described below. The CAN2 network 202 is configured by an ECU 31, an ECU 32, an ECU 33, and a CAN2 controller 4 to be described below. The LIN network 203 is configured by an ECU 41, an ECU 42, an ECU 43, and a LIN controller 5 to be described below. The FlexRay network 204 is configured by an ECU 51, an ECU 52, an ECU 53, and a FlexRay controller 6 to be described below. The MOST network 205 is configured by an ECU 61, an ECU 62, an ECU 63, and a MOST controller 7 to be described below.

The first network 100 and the second network 200 may include devices other than the devices described above.

(Gateway Device)

The gateway device 1 includes a control unit 2, a storage unit 2a, a CAN1 controller 3, a CAN2 controller 4, a LIN controller 5, a FlexRay controller 6, and a MOST controller 7. Hereinafter, the CAN1 controller 3, the CAN2 controller 4, the LIN controller 5, the FlexRay controller 6, and the MOST controller 7 are collectively referred to as controllers 3 to 7.

The control unit 2 includes a CPU, a RAM, and a ROM that stores a program to be described below. The CPU develops a program stored in the ROM in the RAM and executes the program. The control unit 2 is connected to the storage unit 2a and the controllers 3 to 7 via signal lines. The control unit 2 is connected to a first network 100 to be described below via a communication port (not illustrated). Data that the controllers 3 to 7 receive from the second network 200 is input to the control unit 2. If the data received from the controllers 3 to 7 meets conditions to be described below, the control unit 2 transmits the data to the first network 100. Hereinafter, processing of transmitting data that the control unit 2 receives from the controllers 3 to 7 to the first network 100 will be referred to as "transfer". This transfer processing will be described below in detail.

The storage unit 2a is a nonvolatile memory, and the storage unit 2a stores a destination table 8 indicating a destination of data to be transferred from the second network 200 to the first network 100, and a transmission source table 9 indicating an identifier in the first network 100 of the controllers 3 to 7. The destination table 8 and the transmission source table 9 will be described below in detail.

Each of the controllers 3 to 7 includes a physical connection port to be connected to the second network 200 and a microcomputer performing calculation necessary for transmitting and receiving data.

The CAN1 controller 3 is one of apparatuses configuring the CAN1 network 201 and transmits and receives data to and from other apparatuses configuring the CAN1 network 201. The CAN1 controller 3 can be regarded as a communication port connecting the gateway device 1 to the CAN1 network 201.

The CAN2 controller 4 is one of the apparatuses configuring the CAN2 network 202, and transmits and receives data to and from other apparatuses configuring the CAN2 network 202. The CAN2 controller 4 can be regarded as a communication port connecting the gateway device 1 to the CAN2 network 202.

The LIN controller 5 is one of apparatuses configuring the LIN network 203, and transmits and receives data to and from other apparatuses configuring the LIN network 203. The LIN controller 5 can be regarded as a communication port connecting the gateway device 1 to the LIN network 203.

The FlexRay controller 6 is one of apparatuses configuring the FlexRay network 204, and transmits and receives data to and from other apparatuses configuring the FlexRay network 204. The FlexRay controller 6 can be regarded as a communication port connecting the gateway device 1 to the FlexRay network 204.

The MOST controller 7 is one of apparatuses configuring the MOST network 205, and transmits and receives data to and from other apparatuses configuring the MOST network 205. The MOST controller 7 can be regarded as a communication port connecting the gateway device 1 to the MOST network 205.

(IP Address)

"192.168.1.100" is set to the control unit 2 as an IP address in order to communicate with the first network 100. "192.168.0.1", "192.168.0.2", "192.168.0.3", "192.168.0.4", and "192.168.0.5" are respectively associated with the CAN1 controller 3, the CAN2 controller 4, the LIN controller 5, the FlexRay controller 6, and the MOST controller 7 by the transmission source table 9, as IP addresses which are identifiers of the IP networks.

The IP addresses associated with the controllers 3 to 7 are used to indicate the respective controllers and the second network 200 to which the controllers belong, and the controllers 3 to 7 do not perform communication by using the IP addresses. That is, the IP addresses are virtual.

(Structure of Data which is Transmitted and Received)

Since the first network 100 and the second network 200 have different communication protocols, structures of data which is transmitted and received also differ from each other. However, data transmitted and received by using any of the communication protocols is also configured by a "header" necessary for controlling communication and a "payload" which does not contribute to control of communication. For example, the "header" includes information indicating a transmission destination of data, information indicating a classification of data, and information for detecting an error of transmission and reception.

Both the high-level data and the low-level data described above are configured by a header and a payload.

The controllers 3 to 7 divide data received from the second network 200 into a header portion and a payload portion, and transmit the divided data to the control unit 2.

Hereinafter, the data which is transmitted and received to and from the first network 100, that is, a header of an IP packet is referred to as an IP header, and a payload of the IP packet is referred to as an IP payload. Hereinafter, a header of data transmitted and received to and from the CAN1 network 201 and CAN2 network 202 is referred to as a CAN header, and a payload of the same data is referred to as a CAN payload.

(Destination Table)

The destination table 8 is a table referred to by the control unit 2 for determining whether or not data received by the controllers 3 to 7 is transferred and for determining a transmission destination at the time of transfer.

FIG. 2 is a diagram illustrating an example of the destination table 8. The destination table 8 is configured by three items of a communication port, a destination identifier, and a transmission destination IP address. The "communication port" indicates communication ports for the second network 200 of the gateway device 1, that is, the communication ports are the controllers 3 to 7. The "destination identifier" is a character string included in headers of data received from the second network 200. The "transmission destination IP address" is a transmission destination of data which is transferred and is an IP address indicating any one of apparatuses belonging to the first network 100.

If receiving data from the controllers 3 to 7, the control unit 2 specifies a controller that transmits the data, and determines whether or not a destination identifier corresponding to the controller is included in a header of the data. In a case where the destination identifier is included in the header, the control unit 2 transmits the data to a transmission destination IP address associated with the destination identifier thereof. In a case where the destination identifier is not included in the header, the control unit 2 discards the data.

For example, if "A1" is included in a header of data received from the CAN1 controller 3 by the control unit 2, the control unit 2 transmits the data to "192.168.1.1" of the first network 100. In the same manner, if "A2" is included in the header of the data received from the CAN1 controller 3, the control unit 2 transmits the data to "192.168.1.2" of the first network 100.

However, as described above, the destination identifier is distinguished for each communication port. In other words, a namespace of the destination identifier differs for each communication port. For example, in a case where none of destination identifiers "B1", "B2", and "B3" associated with the CAN2 controller 4 is included in a header of data received from the CAN2 network 202 by the CAN2 controller 4, the data is discarded.

(Transmission Source Table)

The transmission source table 9 is a table referred to by the control unit 2 so as to determine a transmission source IP address stored in a header, in the data transferred from the second network 200 to the first network 100.

FIG. 3 is a diagram illustrating an example of the transmission source table 9. The transmission source table 9 is configured by a communication port and a transmission source IP address. The "communication port" indicates communication ports for the second network 200 of the gateway device 1, that is, the communication ports are the controllers 3 to 7. The "transmission source IP address" indicates IP addresses stored in regions indicating the transmission source IP addresses of headers, in the data transferred to the first network 100.

When data received from the second network 200 by the controllers 3 to 7 is transferred to the first network 100, the control unit 2 specifies a controller that transmits the data to the control unit 2. The control unit 2 refers to the transmission source table 9 and specifies an IP address associated with the specified controller. The control unit 2 stores the IP address in a region indicating the transmission source IP address in a header of the data transferred, and transmits the IP address to the first network 100. For example, in a case where the data received by the CAN1 controller 3 is transferred, "192.168.0.1" is stored in a transmission source IP address storage region in a header of the data.

(Configuration of ECU)

A configuration of the ECUs 11 to 13 belonging to the first network 100 will be described.

FIG. 4 is a diagram illustrating the configuration of the ECUs 11 to 13.

The ECUs 11 to 13 include an ECU control unit 151, an ECU communication unit 152, and an ECU storage unit 153. The ECU control unit 151 includes a CPU, a RAM, and a ROM. The ECU communication unit 152 communicates with other ECUs belonging to the first network 100 and the gateway device 1. The ECU storage unit 153 is a nonvolatile memory, and stores the received data processing program 154 and the transmission source table 9. The CPU of the ECU control unit 151 develops the received data processing program 154 in the RAM to execute.

If the ECU communication unit 152 receives an IP packet from the gateway device 1, the ECU control unit 151 extracts a transmission source IP address included in a header of the IP packet. The ECU control unit 151 inputs the IP address and the received IP packet to the received data processing program 154. In other words, the transmission source IP address is input to the received data processing program 154 as an argument.

The received data processing program 154 processes data transferred from the second network 200 by the gateway device 1. The data transferred from the second network 200 is data generated by any one of the ECUs 21 to 63. The received data processing program 154 determines which network transmits the received data, based on the transmission source IP address given as an argument. Specifically, it is determined which of the CAN1 network 201, the CAN2 network 202, the LIN network 203, the FlexRay network 204, and the MOST network 205 transmits the IP packet. The received data processing program 154 determines processing of a payload of the IP packet received based on a transmission source network of the determined data. The received data processing program 154 refers to the transmission source table 9 as necessary, and specifies a name of a communication port and a name of a transmission source network which are associated with the transmission source IP address input as an argument.

(Flowchart of Data Transfer)

If receiving data from the controllers 3 to 7, the control unit 2 develops a data transfer program stored in the ROM in the RAM and executes the data transfer program. As described above, data received from the controllers 3 to 7 is divided into a header and a payload. In addition, the control unit 2 can specify which controller transmits the data.

FIG. 5 is a flowchart illustrating an operation of the data transfer program. An execution subject of the following steps is the CPU of the control unit 2.

In step S301, a destination identifier corresponding to a communication port that transmits data is specified with reference to the destination table 8, and the processing proceeds to step S302. For example, in a case where the LIN controller 5 transmits data to the control unit 2, "C1", "C2", and "C3" are specified as destination identifiers.

In step S302, it is determined whether or not the destination identifier specified in step S301 is included in a header of the received data. Specifically, determination is made based on data stored in the following region of a header for each protocol. In a case where the protocol is CAN, determination is made by using a CAN ID, in a case where the protocol is FlexRay, determination is made by using a frame ID, in a case where the protocol is LIN, determination is made by using ProtectedID, and in a case where the protocol is MOST, determination is made by using a combination of TargetAddress and SorceAddress because a field storing a data type is not included in a header part. In a case where it is determined that a destination identifier is included, the processing proceeds to step S303, and in a case where it is determined that the destination identifier is not included, the processing proceeds to step S307.

In step S303, a transmission destination IP address associated with the destination identifier determined to be included in the header in step S302 is acquired with reference to the destination table 8. For example, in a case where "C2" is included in the header, "192.168.1.2" is acquired as the transmission destination IP address. Next, the processing proceeds to step S304.

In step S304, the transmission source IP address associated with a controller that transmits data is acquired with reference to the transmission source table 9. For example, in a case where data is received from a LIN controller, "192.168.0.3" is acquired as the transmission source IP address. Next, the processing proceeds to step S305.

In step S305, an IP packet is generated. In a header of the IP packet, the IP address acquired in step S303 is set in a region where the transmission destination IP address is stored, and the IP address acquired in step S304 is set in a region where the transmission source IP address is stored. The header and payload of the received data are included in a payload of the IP packet as they are. In other words, in the present step, the data received from the second network 200 is encapsulated into the IP packet. Next, the processing proceeds to step S306.

In step S306, the IP packet generated in step S305 is transmitted to the first network 100. In this state, the operation of the flowchart illustrated in FIG. 5 ends.

In step S307 performed in a case where it is determined that the header of the received data does not include the destination identifier, the received data is discarded and the operation of the flowchart illustrated in FIG. 5 ends.

OPERATION EXAMPLE

FIG. 6 is a transition diagram illustrating an operation example of data transfer. FIG. 6 illustrates a transition diagram in a case where the ECU 31 belonging to the CAN2 network 202 transmits data which is a transfer target to the first network 100. Here, it is assumed that the destination table 8 stores the values illustrated in FIG. 2 and the transmission source table 9 stores the values illustrated in FIG. 3. Hereinafter, the step numbers illustrated in FIG. 6 and the step numbers attached to the flowchart of FIG. 5 will be used together.

If data having a CANID, which is a part of a CAN header, of "B1" and a payload of "XYZ" is transmitted from the ECU 31, the CAN2 controller 4 acquires the data (S501 of FIG. 6). The CAN2 controller 4 transmits the data to the control unit 2 (S502 of FIG. 6).

The control unit 2 specifies "B1", "B2", and "B3" as destination identifiers associated with the CAN2 controller 4 (S301 of FIG. 5), and the control unit 2 determines that "B1" which is one of "B1", "B2", and "B3" is included in the header (S302 of FIG. 5: YES) and acquires "192.168.1.1" which is the transmission destination IP address associated with B1 (S303 of FIG. 5), with reference to the destination table 8. Subsequently, the control unit 2 acquires "192.168.0.2" which is a transmission source IP address associated with the CAN2 controller 4 (S304 of FIG. 5) with reference to the transmission source table 9. The control unit 2 generates a header of the IP packet and stores "B1" which is CANID and "XYZ" which is a CAN payload in the payload of the IP packet (S305 of FIG. 5), based on the information. The control unit 2 transmits the generated IP packet to the first network 100 (S306 of FIG. 5), and the packet reaches the ECU 13 (S503 of FIG. 6).

If the ECU communication unit 152 receives an IP packet, the ECU control unit 151 of the ECU 13 extracts a transmission source IP address from the IP packet. The ECU control unit 151 reads the received data processing program 154 into a RAM and executes the program, and gives the extracted transmission source IP address to the program as an argument.

According to the above-described first embodiment, the following action effects can be obtained.

(1) The gateway device 1 is connected to a high-level network which uses a predetermined communication protocol, that is, the first network 100, and two or more low-level networks which use communication protocols different from the high-level network, that is, the CAN1 network 201, the CAN2 network 202, the LIN network 203, the FlexRay network 204, and the MOST network 205. High-level data transmitted and received to and from the high-level network, that is, an IP packet is configured by a header and a payload. The gateway device 1 is connected to the respective low-level networks, and includes a plurality of communication ports that receive low-level data transmitted and received to and from the low-level network, that is, the controllers 3 to 7, the storage unit 2a that stores the transmission source table 9 defining by associating each of the plurality of communication ports with source identifiers, and the control unit 2 that generates the high-level data and transmits the data to the high-level network. A payload of the high-level data generated by the control unit 2 includes the low-level data received by the communication port. A header of the high-level data generated by the control unit 2 includes a source identifier associated with the communication port.

Since the gateway device 1 is configured in this way, the ECUs 11 to 13 received the high-level data, that is, the IP packet can easily determine which low-level network transmits the received high-level data, by using a source identifier included in the header, that is, a transmission source IP address.

(2) A communication protocol used by a high-level network, that is, the first network 100 is an internet protocol. High-level data is an IP packet. A source identifier is an IP address associated with a communication port that receives low-level data. The control unit 2 stores the IP address associated with the communication port that receives the low-level data in a transmission source IP address storage region provided in a header of the IP packet to be generated.

Since the transmission source IP address is a component of the standardized IP header, the ECUs 11 to 13 which receive the IP packet can easily extract a transmission source IP address. That is, the ECUs 11 to 13 can easily determine a transmission source network of the received data.

(3) The storage unit 2a further stores the destination table 8 that defines association between a destination identifier and a transmission destination IP address which are included in low-level data. If receiving the low-level data from a low-level network, the control unit 2 specifies the transmission destination IP address associated with the destination identifier included in the low-level data, and stores the specified transmission destination IP address in a transmission destination IP address storage region provided in a header of an IP packet to be generated.

Accordingly, the gateway device 1 can transfer the received low-level data to an ECU having a specified IP address associated with the destination identifier in the destination table 8.

(4) Low-level data is configured by a low-level header and a low-level payload. The destination identifier is included in the low-level header. If receiving the low-level data from a low-level network, the control unit 2 specifies a transmission destination IP address associated with the destination identifier included in the low-level header of the low-level data.

Since the control unit 2 can specify the transmission destination IP address based on information stored in the specified region of the low-level header defined in each protocol, in transfer of the low-level data, processing is simple and easy. In a case where the destination identifier is included in the low-level payload, data format of the low-level payload is not defined in the standard, and thereby, the processing is complicated, but according to the present embodiment, such inconvenience does not occur.

(5) In the destination table 8, an association between a transmission destination IP address and a destination identifier is defined for each communication port, that is, each of the controllers 3 to 7. A transmission destination IP address storage region is set in a header of an IP packet. The control unit 2 stores the transmission destination IP address associated with the destination identifier in the transmission destination IP address storage region, in the communication port which receives low-level data.

Accordingly, it is unnecessary to match destination identifiers in individual networks configuring the second network 200, and setting is simple. In other words, it is possible to freely set an association between the destination identifier and the transmission destination IP address for each network configuring the second network 200. That is, since a namespace of the destination identifier differs for each communication port, there is no possibility that the destination identifiers set in each of the low-level networks collide with each other.

(6) A computing device, that is, the ECUs 11 to 13, include a computing device reception unit 152 that receives high-level data, that is, an IP packet from the gateway device 1, and a received data processing determination unit, that is, an ECU control unit 151 that determines processing of a received payload, based on a source identifier included in a header configuring the received high-level data.

Accordingly, the ECUs 11 to 13 can determine the processing of the payload by reading a header of the received IP packet.

(7) The received data processing determination unit of the ECUs 11 to 13, that is, that is, the ECU control unit 151 inputs a source identifier to a computer program processing the payload, that is, the received data processing program 154 as a parameter, based on the source identifier.

Accordingly, the ECUs 11 to 13 can input information indicating a transmission source network of the payload to the received data processing program 154 as a parameter, thereby facilitating processing of the payload. The received data processing program 154 can grasp an outline of the payload, based on information of the transmission source network of the payload and grasp details of a low-level payload, based on a low-level header included in the payload.

The above-described first embodiment may be modified as follows.

Modification Example 1

In the above-described first embodiment, the controllers 3 to 7 divide low-level data into a low-level header and a low-level payload, and the control unit 2 extracts a destination identifier from the low-level header. However, role sharing of the control unit 2 and the controllers 3 to 7 is not limited to this. The control unit 2 and the controllers 3 to 7 configuring the gateway device 1 may collectively perform the role.

For example, the controllers 3 to 7 may directly transmit the received low-level data to the control unit 2, and the control unit 2 may divide the low-level data into a low-level header and a low-level payload. In addition, the controllers 3 to 7 that receive the low-level data may extract destination identifier from the low-level data and may transmit the extracted destination identifier and low-level data to the control unit 2.

Modification Example 2

In the above-described first embodiment, an association between a transmission destination IP address and a destination identifier is defined for each communication port, that is, for each of the controllers 3 to 7, in the destination table 8. However, the destination table 8 may have the same association between the destination identifier and the transmission destination IP address without distinguishing between the communication ports, that is, the controllers 3 to 7. For example, even in a case where a destination identifier "AAA" is received by any one of the controllers 3 to 7, the destination identifier may be associated with the same transmission destination IP address.

Modification Example 3

In the above-described first embodiment, the control unit 2 stores received low-level data, that is, a low-level header and a low-level payload in an IP payload. However, the IP payload may not include a low-level header, and may include at least a part of the payload.

Modification Example 4

In the above-described first embodiment, a destination identifier is stored in a header of low-level data. However, the destination identifier may be stored in a payload of the low-level data.

Modification Example 5

In the above-described first embodiment, the control unit 2 sets an IP address in a transmission destination IP address storage region of an IP header which is generated, based on a destination identifier included in the received CAN header. However, the control unit 2 may set a predetermined IP address previously determined in the transmission destination IP address storage region of an IP header which is created. The predetermined IP address may be a unicast address indicating only an IP address assigned to a specified device or may be a multicast address which is an IP address assigned to a group to which a plurality of devices belong.

According to modification example 5, the following action effect can be obtained.

(1) The control unit 2 stores a predetermined multicast address in a transmission destination IP address storage region provided in a header of an IP packet to be generated.

Accordingly, the gateway device 1 can transfer low-level data received from the second network 200 to a plurality of ECUs specified by the multicast address.

Modification Example 6

In the first embodiment, a destination identifier and a transmission destination IP address are associated with each other in the destination table 8. However, the destination identifier and a transmission destination MAC address may be associated with each other in the destination table 8. In this case, for example, the configuration may be changed as follows.

In the transmission source table 9, a communication port and a transmission source MAC address are defined in association with each other. In the destination table 8, the destination identifier and the transmission destination MAC address are defined in association with each other.

In a case where a destination identifier associated with the controller in the destination table 8 is included in a header of low-level data received from the controllers 3 to 7, the control unit 2 specifies the transmission destination MAC address associated with the destination identifier. Subsequently, the control unit 2 specifies the transmission source MAC address associated with a controller that transmits the data. Furthermore, the control unit 2 generates the following MAC frame. That is, in a header of the MAC frame which is generated, a specified transmission destination MAC address is stored in a transmission destination MAC address storage region, and a specified transmission source MAC address is stored in a transmission source MAC address storage region. The received low-level data is stored in a payload of the MAC frame which is generated. The control unit 2 sends the created MAC frame to the first network 100.

Furthermore, a virtual LAN (VLAN) assigned to an ECU connected to a first network may be associated with a destination identifier.

Modification 7

Configurations of the first network 100 and the second network 200 are not limited to the configurations of the first embodiment.

The second network 200 may be configured by at least two non-IP networks. For example, the second network may be configured by six or more non-IP networks more than the networks of the first embodiment, or the second network 200 may be configured only by the LIN network 203 and the MOST network 205. In addition, the second network 200 may include a network which uses a communication protocol other than the communication protocol described in the first embodiment.

The first network 100 may be configured by a TCP/IP network, and the number of configured networks and the number of connected devices are not limited. For example, an IP address of the ECU 11 is set to "192.168.1.1/24", an IP address of the ECU 12 is set to "192.168.2.2/24", and an IP address of the ECU 13 is set to "192.168.3.3/24", and thereby, the first network 100 may be configured by three TCP/IP networks. Furthermore, network addresses of virtual IP addresses of the controllers 3 to 7 may be the same as addresses of the first network 100.

Second Embodiment

A second embodiment of the gateway device will be described with reference to FIG. 7. In the following description, the same symbols are attached to the same configuration elements as in the first embodiment, and a different point will be mainly described. Points not described in particular are the same as in the first embodiment. The present embodiment is different from the first embodiment mainly in that priority of an IP packet which is transferred is defined together in the destination table 8.

(Configuration)

In the present embodiment, a destination table 8a is stored in the storage unit 2a of the gateway device 1, instead of the destination table 8 according to the first embodiment.

The destination table 8a is a table that is referred to for determining whether or not the control unit 2 transfers data received by the controllers 3 to 7, for determining a transmission destination at the time of transfer and priority which is given to an IP packet to be generated.

FIG. 7 is a diagram illustrating an example of the destination table 8a. The destination table 8a is configured by four items of a communication port, a destination identifier, a transmission destination IP address, and a priority value. The "communication port", the "destination identifier", and the "transmission destination IP address" are the same as in the first embodiment. The "priority value" is a value indicating priority given to an IP packet, and indicates that the larger the value, the higher priority is given to transfer processing of the first network 100. The priority value is, for example, a value stored in the first three bits in a region indicating a type of service (TOS) of an IP header, "0" indicates the lowest priority, and "7" indicates the highest priority.

(Flowchart of Data Transfer)

In a second embodiment, operations in steps S303 and S305 are changed from the operation in the first embodiment.

In step S303, a transmission destination IP address associated with a destination identifier determined to be included in a header in step S302 and a priority value are acquired with reference to the destination table 8a. For example, in a case where "A2H" is included in a CAN header received from the CAN1 controller 3, "192.168.1.2" is acquired as the transmission destination IP address, and "7" is acquired as the priority value.

In step S305, an IP packet is generated. In a header of the IP packet, the IP address acquired in step S303 is set in a region where the transmission destination IP address is stored, the IP address acquired in step S304 is set in a region where the transmission source IP address is stored, and the obtained priority value is set in the first three bits in a region indicating TOS of the IP header. A header and a payload of the received data are included in the payload of the IP packet as they are.

According to the above-described embodiment, the following action effects are obtained.

(1) In the destination table 8a of the gateway device 1, a transfer priority associated with a destination identifier is defined. In a header of an IP packet, a priority storage region for storing priority of transfer processing of the IP packet in a high-level network is set. The control unit 2 stores the transfer priority associated with the destination identifier included in the received low-level data in the priority storage region.

Accordingly, the control unit 2 can set a priority order of the IP packets transmitted from the control unit 2 to the first network 100 and a priority order of the IP packets processed in a router (not illustrated) in the first network 100, based on a destination identifier.

Modification Example of Second Embodiment

In the second embodiment described above, the priority stored in the destination table 8a is arbitrarily set. However, information indicating the highest priority may be set for all the priorities stored in the destination table 8a. For example, in a case where the priority is set to "0" to "7", the priority stored in the destination table 8a is set to "7" indicating all the highest priorities.

According to the modification example, the following action effect can be obtained.

(1) Information indicating the highest priority is set for all the priorities stored in the destination table 8a.

Accordingly, the priority higher than priorities of other packets, that is, the IP packets received and transmitted from and to, for example, the ECUs 11 to 13 is set to packets transferred from the second network 200 to the first network 100 by the gateway device 1. That is, in the first network 100, the packet transferred by the gateway device 1 is more preferentially transmitted to a transmission destination than the other packets.

Third Embodiment

A third embodiment of the gateway device will be described with reference to FIG. 8. In the following description, the same symbols are attached to the same configuration elements as in the first embodiment, and a different point will be mainly described. Points not described in particular are the same as in the first embodiment. The present embodiment is different from the first embodiment mainly in that a time stamp is given to data transferred by the gateway device.
(Configuration)

In the present embodiment, a program stored in the ROM of the control unit 2 is different. The program stored in the ROM of the control unit 2 according to the present embodiment records time and gives a time stamp which will be described next, in addition to processing according to the first embodiment.

In the present embodiment, the ECUs 11 to 13 belonging to the first network 100 transmit a time synchronization packet which will be described below to the gateway device 1 for each predetermined time.
(Processing Flow of Time Synchronization)

FIG. 8 is a diagram illustrating a processing flow of time synchronization performed between the gateway device 1 and the ECUs 11 to 13. However, in FIG. 7, the ECU 13 is described as a representative of the ECUs 11 to 13. Hereinafter, description will be made by using the step numbers in FIG. 8.

The ECU 13 periodically transmits a time synchronization packet 700 which is an IP packet. "192.168.1.3" which is an IP address of the ECU 13 as a transmission source IP address is stored in a header of the time synchronization packet 700. Clock information and a sequence number of the ECU 13 are stored in a payload of the time synchronization packet 700. For example, in a case where the time synchronization packet 700 is generated at time TM1 of the ECU 13, the clock information TM1 of the time synchronization packet 700 and "1" as the sequence number are stored (S710). The sequence number is counted up every time the time synchronization packet 700 is sent from the ECU 13. By referring to the sequence number, a transmission error and the like of the time synchronization packet 700 can be detected.

If the gateway device 1 receives the time synchronization packet 700 at the TS1 of the gateway device 1, the control unit 2 of the gateway device 1 records the following information in the storage unit 2a. That is, the control unit 2 stores "192.168.1.3" which is a transmission source IP address of the time synchronization packet, the clock information "TM1" included in the time synchronization packet, the sequence number "1", and the reception time "TS1" of the gateway device in association with each other. Every time the gateway device 1 receives the time synchronization packet 700 from the same transmission source IP address, the control unit 2 updates the pieces of information recorded in the storage unit 2a.

If the gateway device 1 receives low-level data which includes "B3" that is a destination identifier associated with an IP address of the ECU 13 in a header, and a payload is "XYZ", from the second network 200 at the time TS2 of the gateway device 1, the gateway device 1 performs the following processing in addition to the items described in the first embodiment. That is, the IP payload includes TM1+(TS2−TS1) as data generation time, and a sequence number stored in the storage unit 2a in association with an IP address of the ECU 13 as a sequence number. Thus, a payload of the IP packet generated by the gateway device 1 includes data generation time information, a sequence number, a destination identifier, and a low-level payload. In the present embodiment, the IP packet is referred to as a transfer packet including time information 701. The gateway device 1 sends the transfer packet including time information 701 to the first network 100 (S711).

Here, in a case where there is a difference in elapsed clock time between the ECU 13 and the gateway device 1, for example, in a case where a clock of the ECU 13 proceeds by 1 and in a case where a clock of the gateway device 1 proceeds by 2, it is assumed that a value corrected so as to correspond to the clock time of the ECU 13 is set.

The ECU 13 which receives the transfer packet including time information 701 processes a low-level payload included in an IP payload with reference to the data generation time information included in the transfer packet including time information 701.

According to the third embodiment, the following action effect can be obtained.

(1) The gateway device 1 includes a time acquisition unit that acquires time information of an apparatus belonging to a high-level network and stores the time information in the storage unit in association with an IP address of the apparatus, that is, the control unit 2, and a time stamp generation unit that generates time stamp, that is, data generation time information, that is, the control unit 2. If receiving low-level data from a low-level network, the time stamp generation unit, that is, the control unit 2 specifies an IP address of a transmission destination of the low-level data, based on a destination identifier and a destination table included in the low-level data, and generates a time stamp conforming to a transmission destination apparatus, based on the time when the low-level data is received and the time information associated with the transmission destination IP address stored in the storage unit. The control unit 2 writes the time stamp in a payload of the IP packet which is generated.

The ECU 13 receiving the transfer packet including time information 701 can acquire time when data is generated by referring to the data generation time included in the transfer packet including time information 701. By doing so, it is possible for an application of the ECU 13 to execute processing correction based on the data generation time, and to perform data processing with higher accuracy.

In addition, since the time information of the ECUs 11 to 13 and the time information of the gateway device 1 are not changed, a problem such as rewinding of time does not occur. Furthermore, since the gateway device 1 stores an IP address of the ECU and time information of the ECU in the storage unit 2a in association with each other, the gateway device 1 can individually manage the time information of a plurality of the ECUs, and can provide an appropriate time stamp, that is, data generation time information to the respective ECUs.

Modification Example 1 of Third Embodiment

In the third embodiment described above, the gateway device 1 acquires time information of the ECUs 11 to 13, and generates the transfer packet including time information 701 to which the data generation time conforming to the time information is included. However, the gateway device 1 may provide data generation time based on only the time information of the gateway device 1 without considering the time information of the ECUs 11 to 13, and ECUs 11 to 13 may correct the data generation time, based on a difference between the time information of the gateway device 1 and the time information of the ECU 11. In this case, a time synchronization packet is transmitted from the gateway device 1.

Modification Example 2 of Third Embodiment

In the third embodiment described above, the gateway device 1 stores an IP address of the ECU and time information of the ECU in the storage unit 2a in association with each other. However, the time information of the ECU may be stored in the storage unit 2a without associating the time information of the ECU with the IP address of the ECU. In this case, data generation time information conforming to the time information of the ECU is provided only to transfer data which is transmitted to the specified ECU.

Modification Example 3 of Third Embodiment

Times of the ECUs 11 to 13 may be transferred to the gateway device 1 by a method different from the method according to the third embodiment described above. For example, the times of the ECUs 11 to 13 may be transferred to the gateway device 1 by using a precision time protocol (PTP), a generalized precision time protocol (gPTP), a network time protocol (NTP) or the like as the existing standardized time synchronization method. For example, in a case where the NTP is used, the ECUs 11 to 13 and the gateway device 1 may be configured as follows.

In the following example, the ECUs 11 to 13 have the same function, and thus, the ECU 11 will be described as a representative.

The ECU 11 has a function of an NTP server, and the gateway device 1 has a function of an NTP client. The gateway device 1 includes not only a master clock used for controlling the gateway device 1 but also a timepiece for synchronization that is synchronized with each ECU. That is, the gateway device 1 includes a synchronization timepiece for the ECU 11, a synchronization timepiece for the ECU 12, and a synchronization timepiece for the ECU 13. The gateway device 1 accesses the ECU 11 as an NTP client and synchronizes the synchronization timepiece for the ECU 11 with the timepiece of the ECU 11. The gateway device 1 provides a time stamp, that is, data generation time information to the transfer packet including time information 701 which is transmitted to the ECU 11, using the synchronization timepiece for the ECU 11.

Fourth Embodiment

A fourth embodiment of the gateway device according to the invention will be described with reference to FIG. 9. In the following description, the same symbols are attached to the same configuration elements as in the first embodiment, and a different point will be mainly described. Points not described in particular are the same as in the first embodiment. The present embodiment is different from the first embodiment mainly in that the gateway device sets priority of a transfer work for each network of a transmission source.
(Configuration)

A processing ratio table 801 is further stored in the storage unit 2a of the gateway device 1. The processing ratio table 801 represents an upper limit of a processing ratio of data transmitted from the second network by the gateway device 1.

The control unit 2 of the gateway device 1 divides the number of pieces of data transferred within a predetermined time, according to the processing ratio table 801.

FIG. 9 is a diagram illustrating an example of the processing ratio table 801. The processing ratio table 801 is configured by two fields of a "communication port" and a "processing ratio". The "communication port" is a field corresponding to the controllers 3 to 7 in the same manner as in FIG. 2 and the like. The "Processing ratio" is a field in which a value representing a ratio processed by the gateway device 1 is stored for data transmitted from the second network 200.

The control unit 2 of the gateway device 1 divides the data which is processed within a predetermined time according to the processing ratio. In the example of FIG. 9, for example, in a case where 100 pieces of data per second can be transferred, the CAN1 controller 3 transfers up to 35 pieces of data received from the CAN1 network 201.

According to the above-described embodiment, the following action effects can be obtained.

(1) The storage unit 2a stores the processing ratio table 801 that defines each of a plurality of the communication ports and a ratio of transfer processing in association with each other. The control unit 2 performs generation and transmission of high-level data based on low-level data at the ratio of transfer processing associated with the communication port that receives the low-level data.

Accordingly, data sent from any one network connected to the second network increases, and processing of data sent from another network connected to the second network is not delayed.

Modification Example 1 of Fourth Embodiment

Dividing the amount of data processed by the gateway device 1 according to the fourth embodiment described above may be applied only in a case of a specified condition. The specified condition corresponds to, for example, the following two cases. In the first case, a load of a CPU of the gateway device 1 exceeds a preset value. In the second case, the amount of data flowing through the network exceeds a specified threshold value with respect to a predetermined network among the networks connected to the second network.

Modification Example 2 of Fourth Embodiment

In the above-described fourth embodiment, ratios of each processing are defined for the network connected to the second network. However, priority may be given to the networks connected to the second network, and data transmitted from the networks with higher priority may be sequentially processed. In this case, data sent from networks with lower priority may not be processed for a long time. Accordingly, an upper limit value or the like for processing data sent from one network at a time may be set.

Fifth Embodiment

A fourth embodiment of the gateway device according to the invention will be described with reference to FIGS. 10 to 11. In the following description, the same symbols are attached to the same configuration elements as in the first embodiment, and a different point will be mainly described. The points not described in particular are the same as in the first embodiment. The present embodiment is different from the first embodiment mainly in that a transfer source network is indicated by using a transmission destination TCP port of a TCP header.
(Configuration)

The storage unit 2a of the gateway device 1 includes a transmission source table 9a instead of the transmission source table 9. In the transmission source table 9a, an association between a controller which receives data from the second network 200 and a transmission destination TCP port is defined.

FIG. 10 is a diagram illustrating an example of the transmission source table 9a. The transmission source table 9a is configured by a communication port and a transmission destination TCP port. The "communication port" indicates a communication port for the second network 200 of the gateway device 1, that is, the controllers 3 to 7. The "transmission destination TCP port" is a port number stored in a region indicating a transmission destination TCP port of a TCP header. For example, "50001" is designated as a destination TCP port in a TCP header of data received by the CAN1 controller 3 and transferred to the first network 100.

FIG. 11 is a diagram illustrating a configuration of the ECUs 11 to 13.

In the ECU storage unit 153 of the ECUs 11 to 13, received data processing programs 154a to 154e and the transmission source table 9a are stored instead of the received data processing program 154 and the transmission source table 9. The received data processing programs 154a to 154e perform processing of data transferred from each of the specified second network 200. The correspondence is the CAN1 network 201, the CAN2 network 202, the LIN network 203, the FlexRay network 204, and the MOST network 205 in the order of the received data processing programs 154a to 154e.
(Operation)

If the received low-level header includes a destination identifier indicated in the destination table 8, the control unit 2 specifies a TCP port associated with a communication port which received the data using the transmission source table 9a. The control unit 2 stores the specified TCP port number in a transmission destination TCP port storage region in a header of the TCP packet which is generated and performs transmission. For example, "50001" is designated as a destination TCP port in a TCP header of data received by the CAN1 controller 3 and transferred to the first network 100.

The ECU control unit 151 of each of the ECUs 11 to 13 makes each of the received data processing programs 154a to 154e standby at the associated TCP port with reference to the transmission source table 9a. For example, since the received data processing program 154a corresponds to the CAN1 network 201 as described above, if the transmission source table 9a is as illustrated in the example of FIG. 10, the received data processing program 154a stands by at port 50001.

If the ECU communication unit 152 of the ECUs 11 to 13 receives a TCP packet from the gateway device 1, the ECU control unit 151 extracts a port number stored in the transmission destination TCP port storage region of the received TCP packet. The ECU control unit 151 inputs a payload of the received TCP packet to a program in a standby state at the extracted port number and to cause the program to process the payload. For example, in a case where the extracted port number is 50001, the payload of the received TCP packet is input to the received data processing program 154a that is in the standby state at TCP port 50001 and to be processed.

According to the above-described fifth embodiment, the following action effects can be obtained.

(1) A communication protocol used in a high-level network, that is, the first network 100 is a TCP. A source identifier is a transmission destination TCP port number. The control unit 2 of the gateway device 1 stores a port number associated with a communication port in a storage region of a transmission destination port number provided in a header of high-level data to be generated.

Accordingly, the ECUs 11 to 13 can easily determine which low-level network transmits data, that is, a payload of the received TCP packet by using a transmission destination port number included in a header of the received TCP packet.

(2) A received data processing determination unit, that is, the ECU control unit 151 of the ECUs 11 to 13 determines a computer program for processing a payload, based on a source identifier and a transmission source TCP port number.

Accordingly, data transmitted from the respective networks configuring the second network 200 can be processed by individual programs, that is, the received data processing programs 154a to 154e.

Modification Example of Fifth Embodiment

In the above-described fifth embodiment, a network that transmits the transferred data is described by using a transmission destination TCP port of a TCP header. However, a method of indicating the network that transmits the transferred data is not limited to this. A transfer source network may be indicated by using the transmission source TCP port number of the TCP header or a UDP header may be used instead of TCP.

For example, in a case where the transmission source TCP port of the TCP header is used, a relationship between a communication port and a transmission destination TCP port may be defined in the transmission source table 9a.

Sixth Embodiment

A fifth embodiment of a gateway device according to the invention will be described with reference to FIG. 12. In the following description, the same symbols are attached to the same configuration elements as in the first embodiment, and a different point will be mainly described. Points not described in particular are the same as in the first embodiment. The present embodiment is different from the first embodiment mainly in that a transfer source network is indicated by using a transmission source MAC address of a data frame of a data link layer.

(Configuration)

The storage unit 2a of the gateway device 1 includes a transmission source table 9b instead of the transmission source table 9. In the transmission source table 9b, an association between a controller which receives data from the second network 200 and a transmission source MAC address is defined. The MAC address can also be considered as a virtual MAC address of the controllers 3 to 7.

FIG. 12 is a diagram illustrating an example of the transmission source table 9b. The transmission source table 9b is configured by a communication port and a transmission source MAC address. The "communication port" indicates a communication port for the second network 200 of the gateway device 1, that is, the controllers 3 to 7. The "transmission source MAC address" is a port number stored in a region indicating a transmission destination TCP port of a TCP header. For example, "02:00:00:00:00:01" is designated as the transmission source MAC address in a data frame received by the CAN1 controller 3 and transferred to the first network 100.

(Operation)

If a received low-level header includes a destination identifier indicated in the destination table 8, the control unit 2 uses the transmission source table 9b to specify a MAC address associated with a communication port that receives the data. The control unit 2 stores the specified MAC address in a transmission source MAC address storage region in a header of a data frame which is generated and transmits the specified MAC address. For example, "02:00:00:00:00:01" is designated as the MAC address in the header of the data frame received by the CAN1 controller 3 and transferred to the first network 100.

If the ECU communication unit 152 of the ECUs 11 to 13 receives a data frame from the gateway device 1, the ECU control unit 151 extracts the MAC address stored in the transmission source MAC address storage region of the received data frame. The ECU control unit 151 reads the received data processing program 154 into a RAM to be executed, and provides the extracted MAC address to the program as an argument.

According to the above-described sixth embodiment, the following action effects can be obtained.

(1) A communication protocol used in a high-level network, that is, the first network 100 is IEEE 802.3. A source identifier is a MAC address. The control unit 2 stores the MAC address associated with a communication port in a transmission source MAC address storage region provided in a header of high-level data to be generated.

Accordingly, the ECUs 11 to 13 that receive the data frame can easily determine which low-level network transmits a payload of the received data frame by using the MAC address stored in the transmission source MAC address storage region of the header.

Each of the embodiments and modification examples described above may be combined.

In each of the embodiments and modification examples described above, the gateway device 1 is mounted on a vehicle, but may be mounted on a construction machine. For example, the gateway device 1 may be mounted on an automatic driving dump truck for mining development.

While various embodiments and modification examples are described above, the invention is not limited to the contents. Other embodiments considered within a technical idea of the invention are also included in the scope of the invention.

The disclosed contents of the following priority application is incorporated herein as a quotation.

Japanese Patent Application No. 2015-173894 (filed on Sep. 3, 2015).

REFERENCE SIGNS LIST

1 . . . gateway device
2 . . . control unit
3 . . . CAN1 controller
4 . . . CAN2 controller
5 . . . LIN controller
6 . . . FlexRay controller
7 . . . MOST controller
8 . . . destination table
9 . . . transmission source table
100 . . . first network
152 . . . ECU communication unit
152 . . . computing device reception unit
153 . . . ECU storage unit
154 . . . received data processing program
700 . . . time synchronization packet
701 . . . transfer packet including time information
801 . . . processing ratio table

The invention claimed is:

1. A gateway device that is connected to a high-level network which uses an Internet protocol and two or more low-level networks which use a communication protocol different from the Internet protocol of the high-level network, wherein high-level data that is transmitted and received to and from the high-level network are IP packets which are configured by a header and a payload, wherein the gateway device comprises:

a plurality of communication ports that are connected to the respective low-level networks and receive low-level data that is transmitted and received from the low-level networks;

a memory that stores a transmission source table that defines each of the plurality of communication ports and a plurality of transmission source IP addresses in association with each other, and stores a destination table that defines a plurality of destination identifiers and a plurality of transmission destination IP addresses in association with each other and defines the plurality of destination identifiers and a plurality of transfer priority values in association with each other; and a processor programmed to generate the IP packets and transmit the IP packets to the high-level network, wherein, upon receiving the low-level data from one of the low-level networks by one of the communication ports, the processor is further programmed to:

specify the transmission destination IP address that is associated in the destination table with the destination identifier included in the received low-level data, specify the transfer priority value that is associated in the destination table with the destination identifier included in the received low-level data, specify the transmission source IP address that is associated in the transmission source table with the one of the communication ports,
generate a respective IP packet for the received low-level data,
store the specified transmission destination IP address in a transmission destination IP address storage region of the header of the generated IP packet,
store the specified transfer priority value in a priority storage region of the header of the generated IP packet,
store the specified transmission source IP address in a transmission source IP address storage region of the header of the generated IP packet, and
store at least a part of the low-level data that is received by the one of the communication ports in the payload of the generated IP packet, and
wherein the priority storage region indicates a priority of transfer processing of the generated IP packet.

2. The gateway device according to claim 1,
wherein the low-level data is configured by a low-level header and a low-level payload, and
wherein the destination identifier is included in the low-level header of the received low-level data.

3. The gateway device according to claim 1, wherein a highest value is set for all of the transfer priority values that are stored in the destination table.

4. The gateway device according to claim 1,
wherein the processor is further programmed to acquire time information of an apparatus belonging to the high-level network and store the time information in the memory in association with an IP address of the apparatus,
wherein, upon receiving the low-level data from one of the low-level networks by one of the communication ports, the processor is further programmed to:
generate a time stamp based on a time when the low-level data is received and the time information that is associated with the IP address of the apparatus,
store the generated time stamp in the payload of the generated IP packet.

5. The gateway device according to claim 1, wherein the specified transmission destination IP address is a predetermined multicast address.

6. A gateway device that is connected to a high-level network which uses a predetermined communication protocol and two or more low-level networks which use a communication protocol different from the predetermined communication protocol of the high-level network,
wherein high-level data that is transmitted and received to and from the high-level network is configured by a header and a payload,
wherein the gateway device comprises:
a plurality of communication ports that are connected to the respective low-level networks and receive low-level data that is transmitted and received from the low-level networks;
a memory that stores a transmission source table that defines each of the plurality of communication ports and a plurality of transmission source identifiers in association with each other, and stores a processing ratio table that defines each of the plurality of communication ports and a plurality of transfer processing ratio values in association with each other; and
a processor programmed to generate the high-level data and transmit the high-level data to the high-level network,
wherein, upon receiving the low-level data from one of the low-level networks by one of the communication ports, the processor is further programmed to:
specify the transmission source identifier that is associated in the transmission source table with the one of the communication ports,
generate the respective high-level data for the received low-level data,
store the specified transmission source identifier in a transmission source identifier storage region of the header of the generated high-level data, and
store at least a part of the low-level data that is received by the one of the communication ports in the payload of the generated high-level data,
wherein the processor is further programmed to generate and transmit the high-level data based on the low-level data that is received by the one of the communication ports at the transfer processing ratio value that is associated with the one of the communication port which receives the low-level data.

7. The gateway device according to claim 6,
wherein the predetermined communication protocol that is used in the high-level network is TCP or UDP,
wherein the transmission source identifier is a port number.

8. The gateway device according to claim 6,
wherein the predetermined communication protocol that is used in the high-level network is IEEE 802.3,
wherein the transmission source identifier is a MAC address.

9. The gateway device according to claim 6,
wherein the predetermined communication protocol that is used in the high-level network is Internet protocol,
wherein the transmission source identifier is a transmission source IP address.

10. The gateway device according to claim 6,
wherein the memory stores a destination table that defines a plurality of destination identifiers and a plurality of transmission destination IP addresses in association with each other,
wherein, upon receiving the low-level data from one of the low-level networks by one of the communication ports, the processor is further programmed to:
specify the transmission destination IP address that is associated in the destination table with the destination identifier included in the received low-level data, and
store the specified transmission destination IP address in a transmission destination IP address storage region of the header of the generated IP packet.

11. A gateway device according that is connected to a high-level network which uses an Internet protocol and two or more low-level networks which use a communication protocol different from the Internet protocol of the high-level network,
wherein high-level data that is transmitted and received to and from the high-level network are IP packets which are configured by a header and a payload,
wherein the gateway device comprises:
a plurality of communication ports that are connected to the respective low-level networks and receive low-level data that is transmitted and received from the low-level networks;
a memory that stores a transmission source table that defines each of the plurality of communication ports and a plurality of transmission source IP addresses in association with each other, and stores a destination table that defines a plurality of destination identifiers and a plurality of transmission destination IP addresses in association with each other; and a processor programmed to generate the IP packets and transmit the IP packets to the high-level network, wherein the processor is further programmed to acquire time information of an apparatus belonging to the high-level network and store the time information in the memory in association with an IP address of the apparatus, wherein, upon receiving the low-level data from one of the low-level networks by one of the communication ports, the processor is further programmed to:

specify the transmission destination IP address that is associated in the destination table with the destination identifier included in the received low-level data, specify the transmission source IP address that is associated in the transmission source table with the one of the communication ports, generate a time stamp based on a time when the low-level data is received and the time information that is associated with the IP address of the apparatus, generate a respective IP packet for the received low-level data, store the specified transmission destination IP address in a transmission destination IP address storage region of the header of the generated IP packet, store the specified transmission source IP address in a transmission source IP address storage region of the header of the generated IP packet, store at least a part of the low-level data that is received by the one of the communication ports in the payload of the generated IP packet, and store the generated time stamp in the payload of the generated IP packet.

12. The gateway device according to claim 11, wherein the IP address of the apparatus is the specified transmission destination IP address associated in the destination table with the destination identifier included in the received low-level data.

13. The gateway device according to claim 11, wherein the destination table defines the plurality of destination identifiers and a plurality of transfer priority values in association with each other, wherein, upon receiving the low-level data from one of the low-level networks by one of the communication ports, the processor is further programmed to:

specify the transfer priority value that is associated in the destination table with the destination identifier included in the received low-level data, and store the specified transfer priority value in a priority storage region of the header of the generated IP packet, and wherein the priority storage region indicates a priority of transfer processing of the generated IP packet.

14. The gateway device according to claim 13, wherein a highest value is set for all of the transfer priority values that are stored in the destination table.

15. The gateway device according to claim 11, wherein the low-level data is configured by a low-level header and a low-level payload, and wherein the destination identifier is included in the low-level header of the received low-level data.

16. The gateway device according to claim 11, wherein the specified transmission destination IP address is a predetermined multicast address.

* * * * *